Aug. 2, 1960  R. P. FISHER  2,947,580
BEARING
Filed Sept. 18, 1957  3 Sheets-Sheet 2

INVENTOR.
ROBERT P. FISHER
BY
Mocker+Blum
ATTORNEYS

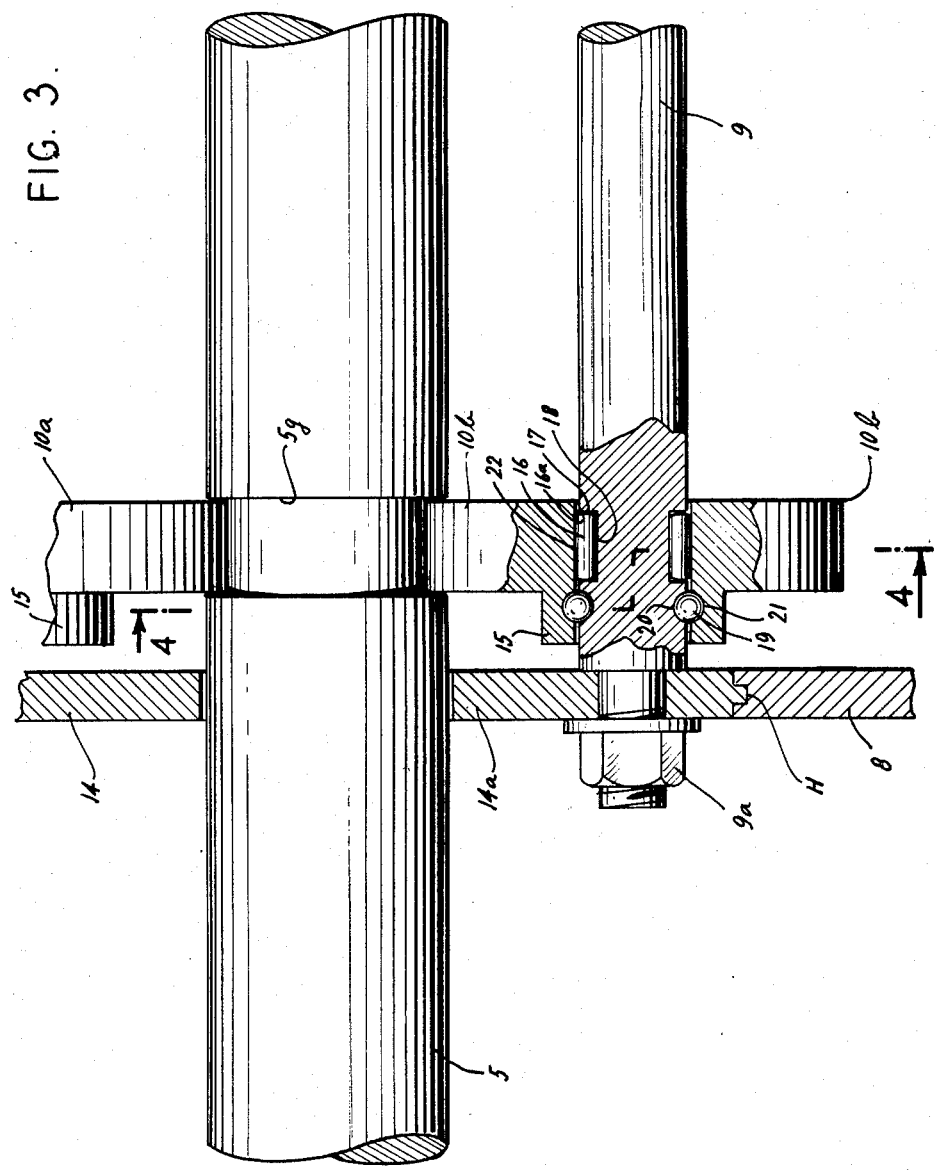

United States Patent Office 2,947,580
Patented Aug. 2, 1960

2,947,580

BEARING

Robert P. Fisher, Los Angeles, Calif., assignor to Microson Equipment Corporation, a corporation of Delaware Filed Sept. 18, 1957, Ser. No. 684,678

1 Claim. (Cl. 308—203)

My invention relates to a new and improved bearing for a rotating shaft which is revolved at high speed, as up to ten thousand revolutions or more per minute, and which is subjected to high longitudinal stresses or end-thrusts in opposed directions parallel to its longitudinal axis of rotation, and to transverse stresses in all directions perpendicular to said longitudinal axis of rotation, by reason of its high speed of revolution and by reason of heavy, applied longitudinal and transverse stresses.

As one example, the improved bearing is particularly suitable as a bearing for a rotatable shaft which is fixed to a rotor, as shown in my application Serial No. 684,-677, filed on Sept. 18, 1957, in the U.S. Patent Office for a comminuting apparatus and method. In such apparatus, the rotating shafts are rotated at high speed, and they are subjected to high longitudinal and transverse stresses, by reason of vibrations and applied stresses.

The ordinary anti-friction roller-bearings and ball-bearings are not effective for the desired purpose, because they permit excessive vibration of the rotating shaft, and such well-known bearings have a short life.

It is, of course, very old to mount a rotating shaft on the tops of rotatable wheels, and to surround a smooth rotating shaft with rotatable rollers in the housing of a bearing.

According to the best embodiment of my invention, but without limitation thereto, and assuming that the rotating shaft has a longitudinal and horizontal axis of rotation which is to be maintained in a fixed, normal position without longitudinal or transverse shifting, I associate said rotating shaft with two supplemental upper non-rotating shafts or stud-shafts and with two supplemental lower non-rotating shafts or stud-shafts. Said supplemental shafts have longitudinal fixed supplemental axes which are horizontal and parallel to the axis of said rotating shaft in its said normal position. Said fixed supplemental axes are equally spaced from said selected or fixed axis of rotation of the rotating shaft.

I provide said rotating shaft with two identical circumferential grooves which are transverse relative to said axis of rotation of said rotating shaft.

For convenience, it is assumed that the axis of rotation of said rotating shaft is horizontal.

Each said groove has identical planar front and rear walls, which are longitudinally spaced from each other. Each said groove has an inner cylindrical wall, which is co-axial with said axis of rotation of said rotating shaft.

I turnably mount two sets of identical wheels on said four supplemental, non-rotating shafts. Save for a collar or flange at the respective supplemental shaft, each said wheel has a main body which has the shape of an annular disc, with an outer cylindrical periphery which is co-axial with the longitudinal axis of the respective supplemental, non-rotating shaft. Each said wheel has a central bore, which extends through said collar. This central bore has a cylindrical face, which is coaxial with the axis of the respective supplemental shaft. The main body of each said wheel has front and rear vertical and planar faces. At its outer edge, each wheel has a close and turnable and anti-friction or rolling contact fit with the respective groove of the rotating shaft.

Hence, at each groove of the rotating shaft, the rotating shaft is supported turnably by and is held against longitudinal and transverse shifting, solely by the four respective anti-friction wheels of the respective set. The two sets of wheels provide the sole bearings for said rotatable shaft.

The cylindrical face of the bore of each wheel contacts turnably with a set of anti-friction rollers, which are located in a shaft-race-groove which is accurately machined in the respective supplemental shaft. These rollers take up stresses on the main rotatable shaft, in a direction perpendicular to the longitudinal axis of said main rotatable shaft. The anti-friction rollers of each set turnably abut each other or substantially turnably abut each other. In order to secure such close contact of the turnable rollers of each set, and as an important feature, I eliminate cages, retainers, rings, and other devices which are usually provided in order to space such anti-friction rollers from each other. These roller-bearings are identical.

I also provide each supplemental shaft with an additional groove of half-spherical shape, which is accurately machined in the supplemental shaft.

I also provide the cylindrical face of the bore of each wheel with a face-groove of half-spherical shape. In the assembly, each said additional half-spherical groove is alined with a face groove to provide a complete assembled race, in which a set of anti-friction balls is located. In each set of ball-bearings, the balls turnably contact with each other or substantially turnably abut each other. In order to secure such close turnable contact in each set of balls, and as an important feature, I eliminate cages, retainers, rings and other devices which are usually provided in order to space said balls from each other. These ball-bearings are identical.

Each identical shaft-race-groove for the rollers has front and rear faces which are longitudinally opposed. Said front and rear faces are vertical and planar. Each said shaft-race-groove for the rollers has an inner cylindrical wall which is concentric with the longitudinal axis of the respective supplemental shaft. Each said roller has a cylindrical face, whose axis is parallel to the axis of the respective supplemental shaft. Each said roller has convex front and rear end-walls, which make only point contact with the front and rear planar faces of the respective grooves. The diameter of the cylindrical face of each roller slightly exceeds the depth of the corresponding shaft-race-groove for the rollers of the supplemental shaft. The cylindrical peripheries or faces of the central bores of the respective wheels turnably abut these anti-friction rollers, so that each supplemental shaft is equally spaced by a clearance from the central bores of the wheels which are rotatably mounted on said supplemental shaft. These clearances are identical at the central bores of all the rotatable wheels.

Since the outer periphery of each rigid wheel has a close and turnable and anti-friction fit with the respective groove of the rotating or main shaft, said main shaft is supported wholly upon the lower wheels of the two sets, and the four wheels of the two sets prevent the main shaft or rotating shaft from shifting longitudinally in either direction from selected, normal position; and the eight wheels of the two sets prevent the main shaft from shifting tranversely in any direction from selected, normal position, thus providing a main shaft whose longitudinal axis of rotation is maintained in fixed, longitudinal, normal position.

Due to the point contact between the tips of said rollers and the front and rear walls of their grooves in the supplemental shafts, said rollers have little or no effect in preventing an axial shifting of the fixed axis of the rotating shaft in either longitudinal direction from true and selected position.

Said undesirable longitudinal shifting of the fixed axis of rotation of the rotating shaft is prevented by means of the set of ball-bearings which is provided at the central bore of each wheel.

The diameters of said anti-friction balls exceed the diameters of said anti-friction rollers. As measured transversely from the axis of each supplemental shaft, each ball has an inner point in the supplemental shaft which is between the inner and outer longitudinal lines of the respective rollers, and each ball has an outer point which is beyond the outer longitudinal line of each roller.

The balls which are below the rotating shaft take up the weight of the rotating shaft and its rotor, to any desired extent, and the balls at the four supplemental shafts may be operative and effective to any desired extent, to prevent any undesirable transverse shifting of the rotating shaft from its normal selected position.

However, it is highly desirable and part of the invention, to provide substantially separate functions for the anti-friction balls and the anti-friction rollers.

The balls operate to prevent the anti-friction wheels from shifting in either longitudinal direction from desired position. For this purpose, the spherical balls may have a transverse dimension or depth which is slightly less than the depths of their grooves or races in the supplemental shaft and in the annular collar or flange of the wheel, and the median front and rear points or tips of said balls have close and turnable and anti-friction contact with the front and rear walls of said half-spherical grooves or races.

Hence, the rolling contact or anti-friction rollers take up all or substantially all transverse stresses upon the wheels and upon the main rotating shaft, and the rolling contact balls take up all or substantially all longitudinal stresses upon the wheels and upon the main rotating shaft.

As another object of my invention, I provide an improved housing for the entire bearing, and I make said bearing of parts which are detachably assembled.

Without limitation to said preferred embodiment, it is described in the annexed drawings and in the following description. The drawings are to scale, save for some very small dimensions, and reference is made to said drawings, as part of the disclosure.

Figs. 1 and 2 are to the same scale.

Fig. 3 is a section on the line 3—3 of Fig. 2.

Figure 4:
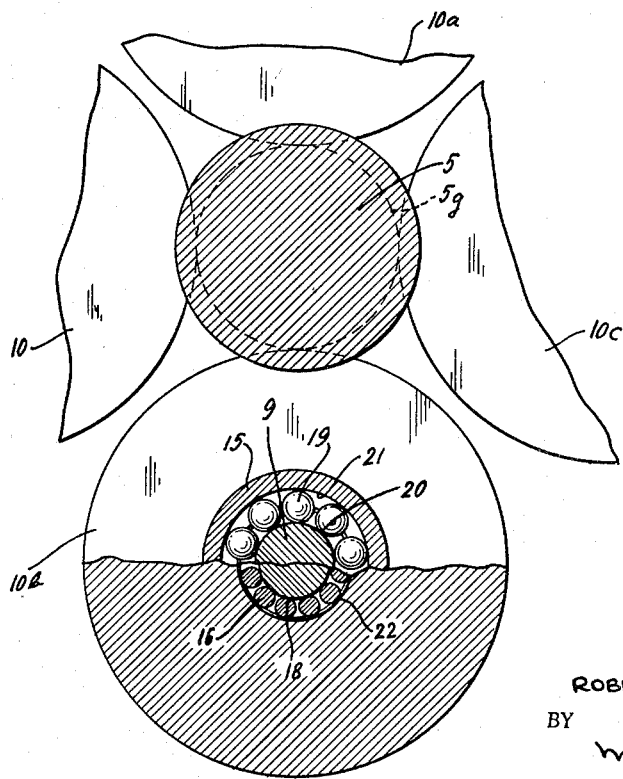

Fig. 4 is a section on the line 4—4 of Fig. 3. Figs. 3 and 4 are to the same scale, which is twice the scale of Figs. 1 and 2.

The housing consists of an upper housing-section 7 and a lower housing-section 8. These housing-sections 7 and 8 are identical. They have horizontal and planar abutting faces at the horizontal line L.

The lower housing-section 8 is detachably fixed by screws or other fastening members 8b to the base 8a. These housing-sections 7 and 8 have respective transverse and horizontal flanges 7a and 8a, which are detachably and firmly clamped to each other by bolts or other devices 27, in order to clamp said housing-sections 7 and 8 rigidly and detachably to each other at line L.

When assembled, these housing-sections 7 and 8 have a front wall F and a rear wall R. These walls F and R are transverse, vertical and identical.

Below and above the line L, the front and rear walls F and R have identical half-circular openings, which are vertically alined, and which abut each other at line L. These openings have planar half-circular walls, which have grooves which interfit with the tongues H.

Above and below the line L, the front and rear walls F and R have identical, half-circular inserts 14 and 14a, which have tongues H which interfit with said grooves of the half-circular openings above and below line L in front wall F and rear wall R. In the assembly shown in Fig. 1, the adjacent planar edges of said inserts 14 and 14a abut at the line L, and the clamped housing-sections 7 and 8 firmly and rigidly clamp these half-inserts 14 and 14a to each other to provide a front assembled insert 14—14a and a rear assembled insert 14—14a. Both said assembled inserts are clamped rigidly in position, to prevent turning of each assembled insert or other movement thereof relative to the assembled housing or casing 7—8.

The front walls and rear walls of the housing-members 7 and 8 have respective half-circular openings which form the assembled circular front and rear openings 28 of the assembled housing. The line L is the median horizontal line of said halves of assembled front and rear openings 28. Said assembled openings 28 are coaxial with the fixed longitudinal axis of rotation of the rotatable and cylindrical main shaft 5, which is conveniently shown in the horizontal position in the drawings.

Said shaft 5 extends through said assembled front and rear openings 28 with substantial clearance, so that said shaft 5 is maintained in normal position, only by the two sets of turnable anti-friction wheels.

In this embodiment, the shaft 5 has two identical bearing grooves 5g. In this embodiment, each groove 5g has front and rear annular walls which are planar and vertical and identical, and each said groove 5g has an inner cylindrical wall which is coaxial with the axis of rotation of shaft 5.

In this embodiment, there are two upper supplemental, non-rotating rods or shafts or stud-shafts 9, and two lower non-rotating supplemental shafts 9. These four shafts are identical.

Figure 1:
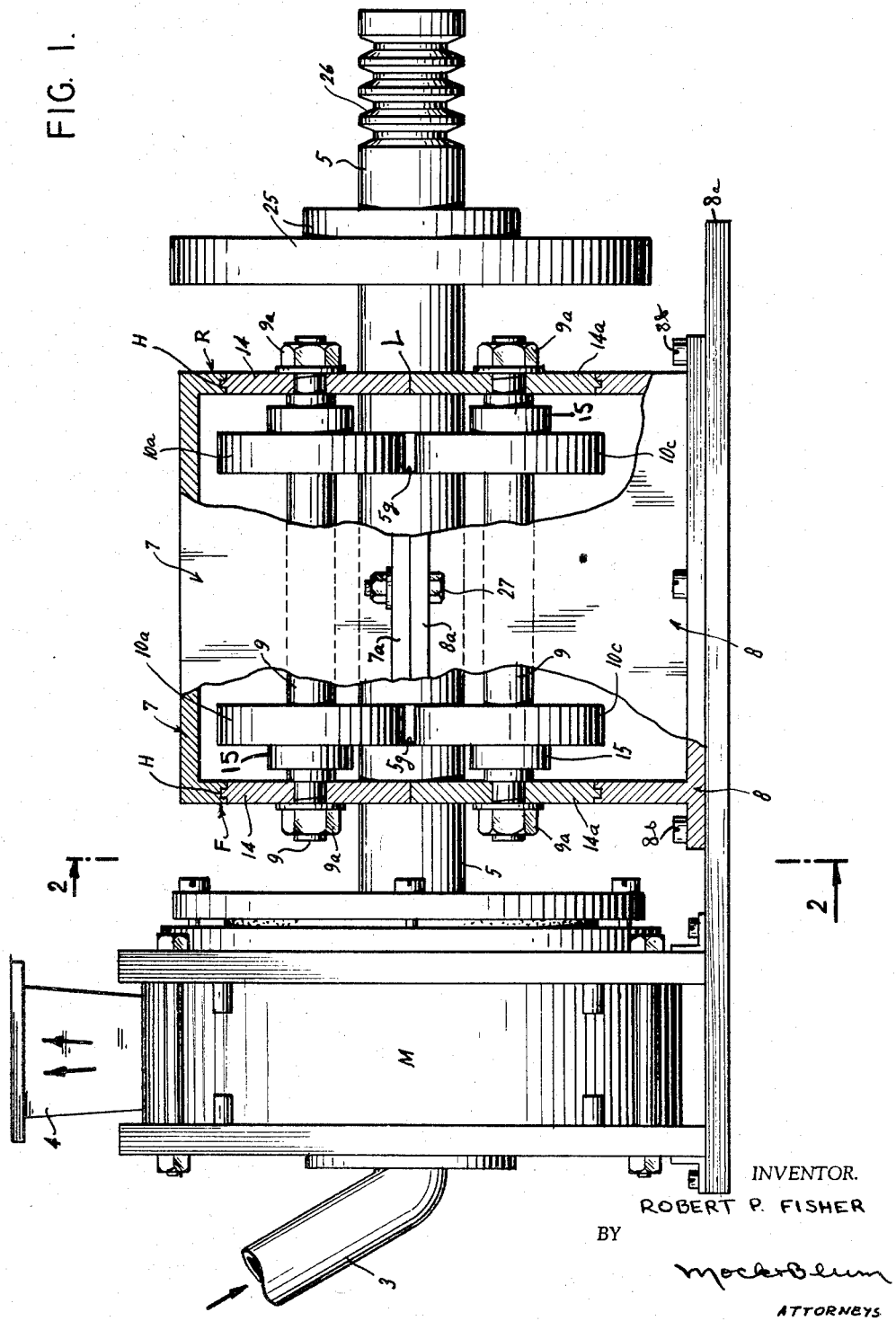
Fig. 1 is a longitudinal elevation, partially in vertical section. Its scale is substantially one-sixth of actual size.
Figure 2:
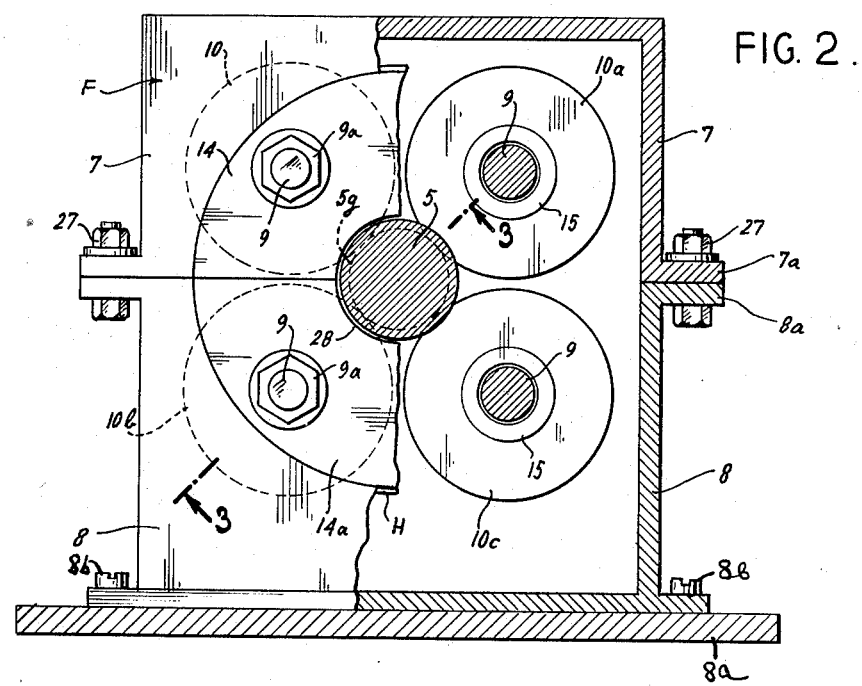
Fig. 2 is a section on the line 2—2 of Fig. 1.

As shown in Fig. 1, each shaft 9 has reduced, cylindrical end-portions, which fit in and extend through openings of the respective longitudinally alined front and rear inserts 14 or 14a.

Each supplemental, non-rotatable shaft 9 also has externally threaded ends which extend in front of the respective front and rear inserts 14 and 14a. Clamping nuts 9a are mounted on these externally threaded ends of said supplemental shafts 9, in order detachably and rigidly to clamp the two upper shafts 9 to the upper front and rear inserts 14 and detachably and rigidly to clamp the two lower supplemental shafts 9 rigidly to the lower front and rear inserts 14a. Each shaft 9 is non-turnable around its respective fixed axis, and is not turnable or otherwise movable relative to the assembled housing 7—8, since the inserts 14 and 14a are rigidly fixed in a non-turnable and non-shiftable manner to the assembled housing or casing 7—8.

The upper supplemental shafts 9 have two sets of rotatable upper wheels 10 and 10a, one set at each groove 5g of rotatable shaft 5.

The lower supplemental shafts 9 have two sets of rotatable lower wheels 10b and 10c, one at each said groove 5g.

These rotatable, anti-friction wheels 10, 10a, 10b, 10c are identical and have a rolling contact with main shaft 5.

Each wheel has a main body which has a cylindrical outer periphery, which is coaxial with the respective longitudinal fixed axis of the respective supplemental shaft 9. Each said wheel also has a central bore, which has a cylindrical face 22 which is coaxial with the respective longitudinal axis of the respective supplemental shaft 9.

The main body of said wheels has parallel vertical and planar faces, save at their respective flanges or collars 15, which have inner cylindrical faces which are longitudinally continuous with said cylindrical faces 22.

At each groove 5g of the main shaft 5, the peripheries of the respective four wheels interfit closely and rotatably in an anti-friction or rolling contact manner with each said group 5g.

Hence, the shaft 5, if horizontal, is supported at its grooves 5g, wholly upon the two lower sets of anti-friction or rolling contact wheels 10b and 10c.

The shaft 5 cannot shift from its selected position, either vertically or horizontally relative to the two sets of anti-friction wheels 10, 10a, 10b, 10c, which are the sole means for supporting shaft 5 and for preventing its longitudinal and transverse shift, and/or preventing or limiting vibration.

Each wheel is mounted rotatably on its respective non-rotating shaft 9, and rolling contact means are provided for mounting each wheel on its non-rotatable supplemental shaft 9, and for preventing each wheel from shifting either horizontally or vertically relative to its shaft 9, so that the longitudinal axis of rotation of main shaft 5 is kept in selected, normal position, without shifting horizontally or vertically from said selected, normal position.

Fig. 3 and Fig. 4 show sets of rollers 16 and sets of balls 19.

Each supplemental shaft 9 has identical grooves or recesses 18 which are vertically aligned with the grooves 5g of the rotatable shaft 5. Each groove or race 18 has identical front and rear walls 17 which are planar and vertical. Each groove or race 18 has an inner cylindrical face which is coaxial with the respective longitudinal axis of the respective shaft 9. These grooves 18 are conveniently designated as shaft-groove-races. They are machined in shaft 9.

The rollers 16 are identical. Each roller 16 has a cylindrical body which has an axis which is parallel to the longitudinal axis of the respective supplemental shaft 9, and is therefore parallel to the axis of rotation of main shaft 5. Each roller 16 is freely turnable in the assembly around its respective longitudinal axis. The diameter of each roller 16 exceeds the depth of its grooves or races 18. Each roller 16 has convex front and rear faces 16a, which make only point contacts with the respective vertical and planar front and rear end-walls 17 of groove 18. By reason of said point contacts, the rollers 16 are designed and adapted to take up all stresses on shaft 5 which are perpendicular to its longitudinal axis of rotation, but said rollers 16 are not designed or adapted to take up longitudinal stresses on shaft 5 which are parallel to its longitudinal axis of rotation. The rollers 16 may be of any type, rigid or non-rigid.

The annular flanges or collars 15 of the respective wheels are identical. Adjacent each supplemental shaft 9, the respective flange 15 has a groove or race 21, which has a substantially half-spherical shape. These grooves or races 21 are identical.

Adjacent each groove or race 21, each shaft 9 has a groove or race 20, whose shape is substantially half-spherical. These grooves or races 20 are identical. Each pair of grooves or races 20 and 21 provides an assembled race for a set of balls 19. Each ball 19 is freely turnable in all directions in said assembled grooves or races 20 and 21.

The cylindrical face 22 of the central bore of each wheel is in close and anti-friction rolling or turnable contact with the outer faces of rollers 16 of the respective set. A slight clearance is shown between cylindrical face 22 and the outer faces of rollers 16, but this is only for convenience of illustration, because in practice, the face 22 fits closely and turnably with an anti-friction or rolling contact fit against rollers 16, and said rollers 16 fit closely and turnably in an anti-friction or rolling contact manner in the respective grooves 18.

The rollers 16 of the eight wheels thus prevent each wheel from shifting transversely in any direction relative to shafts 9 so that the wheels take up all stresses on main shaft 5 in all directions perpendicular to its axis. The front and rear points or tips of balls 19 fit closely but turnably in anti-friction or rolling contact manner against the front and rear walls of the grooves 20 and 21, to prevent each wheel from shifting longitudinally relative to its shaft 9, so that the balls or ball-bearings thus resist front and rear longitudinal end-thrusts on shaft 5.

The depth or transverse dimension of balls 19 may be slightly less than the total depth or transverse dimension of the assembled grooves 20—21, so that the balls 19 function wholly or mainly as end-thrust bearings which function exclusively or mainly to resist longitudinal thrusts on the wheels and on shaft 5.

That is, each ball 19 may make only two-point contact with its respective races, namely, at the front and rear faces of the assembled grooves 20—21, said two-point contact being at the ends of a respective longitudinal axis of each ball 19.

The slight transverse clearance between balls 19 and assembled grooves 20—21, in order to provide such optional two-point contact only at the ends of the longitudinal axis of each ball 19, is too small to be shown in the drawings.

Rolling contact bearings of various types, and their lubrication are well-known, and are described, as one example, in pages 1031–1048 of "Mechanical Engineers' Handbook," fourth edition, published in 1941 by McGraw-Hill Book Company, Inc. The well-known details of rolling contact bearings are not shown herein.

The grooves 5g of shaft 5 and the adjacent parts of the wheels may have any interfitting anti-friction or rolling contact shape, which prevents shaft 5 from being shifted out of its selected position, both longitudinally or transversely.

The shafts 9 may be rotatable and the wheels may be fixed to such rotatable shafts 9. In such case, shafts 9 can be provided with anti-friction or rolling contact bearings as illustrated herein.

In my application filed of even date, I show a casing M. This casing M has an inlet pipe 3, and an outlet 4. Material is fed into casing M through pipe 3, to be comminuted in casing M, and the comminuted material is discharged from outlet 4. The shaft 5 has a rotor fixed to its end which is located within casing 5, and said rotor has radial blades. At high speed of rotation of shaft 5, the unbalanced centrifugal force of said rotor provides severe transverse vibrations and stresses upon shaft 5, and other severe working conditions. The usual anti-friction or rolling contact bearings fail to maintain the shaft 5 in true selected position at high speed of rotation, and the vibration of shaft 5 at its rotor is severe and objectionable.

Actual tests have shown that the anti-friction means of the highly preferred embodiment are effective. Hence, the invention is of particular value in connection with a rotatable shaft which has a rotor or other means which are fixed to one or both ends of said rotatable shaft, and which produce transverse stresses at said end or ends.

The improved bearing of shaft 5 can be used for a shaft which is embodied in apparatus illustrated in Lykken U.S. Patent No. 1,756,253, dated April 29, 1930; and in Lykken U.S. Patent No. 1,838,566, dated Dec. 29, 1930, in which a heavy rotor is fixed to one end of a rotatable shaft, and rotor-blades are fixed to said rotor. In such apparatus, if the shaft 5 is rotated at high speed, said rotor and the working stresses thereon cause severe vibration of the rotating shaft 5 and subject said shaft 5 to severe longitudinal and transverse stresses. In such case, if the rotating shaft 5 is provided with the usual anti-friction or rolling contact bearings, they cannot keep the axis of rotation of the shaft in true straight and fixed position.

In some cases, it is sufficient to provide the main shaft 5 with only a single groove 5g, and to provide a single set of anti-friction wheels at said single groove 59.

The use of four wheels in each set of wheels is preferred. However, the number of wheels in a set or sets can be varied, as long as said wheels are arranged circumferentially around the shaft 5 in sufficient number to resist both longitudinal and transverse stresses on said shaft 5 so that its axis of rotation is maintained straight or substantially straight in true and selected fixed position.

An important feature of my invention is to provide rolling contact bearings 16 and 19 which have no cages or rings or other separating means.

Referring to the roller bearings 19, one-half 20 of their assembled race is machined in the respective shaft 9, and the other half 21 of said assembled race is machined in the housing which is provided by flange 15.

The races 18 for the rollers 16, are machined only in the supplemental shafts 9.

In order to assemble the entire bearing at each shaft 9, the rollers 16 are inserted into their races 18, using a hard and easily fusible oil which is solid or semi-solid at room temperature, thus holding each set of rollers 16 in position. The rollers 16 of each set preferably contact with each other in each race 18, since I do not use cages or retainers or other spacers.

Each shaft 9, with its rollers 16 assembled with its races 18, is then slid into assembled position with its respective wheel with the races 20 of the shaft 9 in vertical alinement with the respective races 21 of the flanges 15.

Holes are provided transversely in each flange 15, in vertical alinement with the respective races 21 of the respective flanges 15. These holes are drilled or otherwise provided in each flange 15, prior to sliding each shaft 9 into the position shown in Fig. 3.

The balls 20 are slipped through these holes into each pair of races 20—21. Each set of balls 20 is thus free from a cage or retainer or other spacer, like the rollers 16, and the balls 20 of each set contact turnably with each other.

When the ball-races 20—21 are thus filled with sets of balls 19, the entry holes of flanges 15 are filled with threaded, tapered plugs which are screwed into position, thus retaining the balls 19 turnably in position, and forming an end-thrust bearing to prevent horizontal shift between each wheel and its respective shaft 9 and preventing longitudinal shift of main shaft 5.

The invention is further disclosed in the appended claim, which also defines the scope of the invention.

I claim:

A bearing for a rotatable shaft which has a longitudinal axis of rotation, comprising a housing which has parts which are fixed to each other in assembled relation to form a complete housing, said housing having longitudinally spaced front and rear walls which are transverse to said axis of rotation, said front and rear walls having inserts therein and fixed rigidly to said front and rear walls, said inserts having longitudinally alined shaft-bores through which said rotating shaft extends with clearance, supplemental shafts having ends which are fixed rigidly to said inserts, said supplemental shafts having shaft-axes which are parallel to said axis of rotation, said rotatable shaft having a plurality of transverse and circumferential bearing grooves between said inserts, each said bearing groove having a set of turnable bearing wheels associated therewith, each said bearing wheel having a central bore through which a respective and non-rotatable supplemental shaft extends, each said bore having a cylindrical bore-face which is coaxial with the respective shaft-axis, each said bearing wheel being rotatable relative to its respective supplemental shaft, each said supplemental shaft having two transverse and circumferential grooves located within said bore-face, one of said grooves being a roller-bearing groove and having a set of anti-friction rollers located therein, said anti-friction rollers extending beyond the respective supplemental shaft to turnably abut said bore-face, the front and rear ends of said roller-bearing groove and the front and rear ends of said rollers being shaped to have only point contact, the other groove of each said supplemental shaft being cup-shaped and being a ball-bearing race in which parts of a set of anti-friction balls are located, said bore-face having a cup-shaped grooved ball-bearing race in which parts of said anti-friction balls are located, said ball-bearing races being shaped to contact with said anti-friction balls substantially only at diameters of said anti-friction balls which are parallel to said axis of rotation, said bearing wheels having peripheries which interfit turnably with said bearing grooves of said rotatable shaft, there being enough bearing wheels around said rotatable shaft to maintain said rotatable shaft in fixed relation to said supplemental shafts.

References Cited in the file of this patent

UNITED STATES PATENTS

| 293,619 | Bishop | Feb. 19, 1884 |
| 1,748,174 | Hirvonen | Feb. 25, 1930 |
| 1,827,968 | Bryant | Oct. 20, 1931 |
| 2,035,160 | Herold | Mar. 24, 1936 |
| 2,661,932 | Woods | Dec. 8, 1953 |
| 2,676,276 | Parker | Apr. 20, 1954 |
| 2,832,969 | Kistler | May 6, 1958 |

FOREIGN PATENTS

| 252,197 | Switzerland | Sept. 16, 1948 |